Aug. 25, 1925.
R. C. McELREE
1,550,980
COMBINATION SWITCHING AND HOLDING BRAKE FOR RAILWAY CARS
Filed Dec. 3, 1923    2 Sheets-Sheet 1
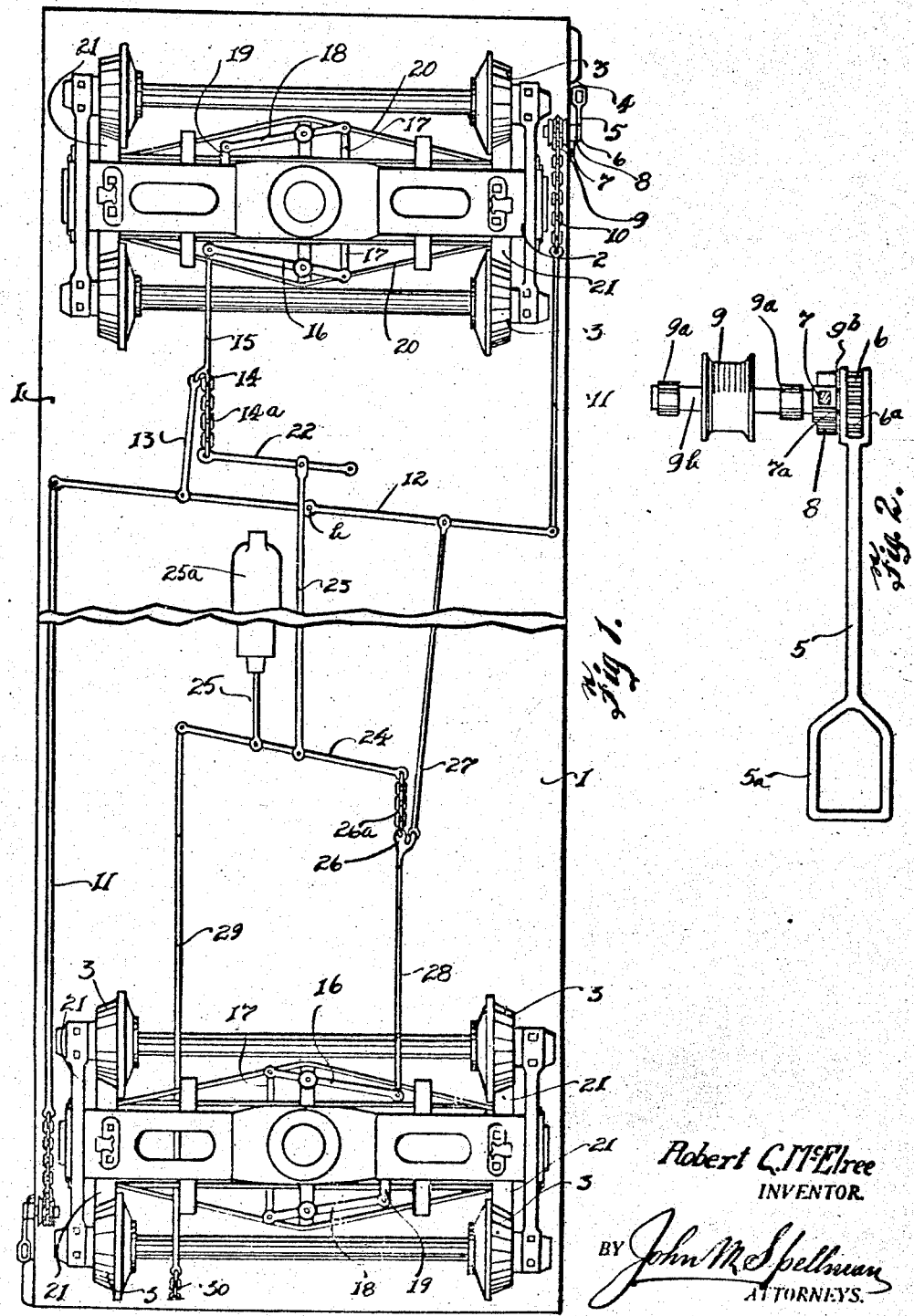
Robert C. McElree
INVENTOR.
BY John M. Spellman
ATTORNEYS.

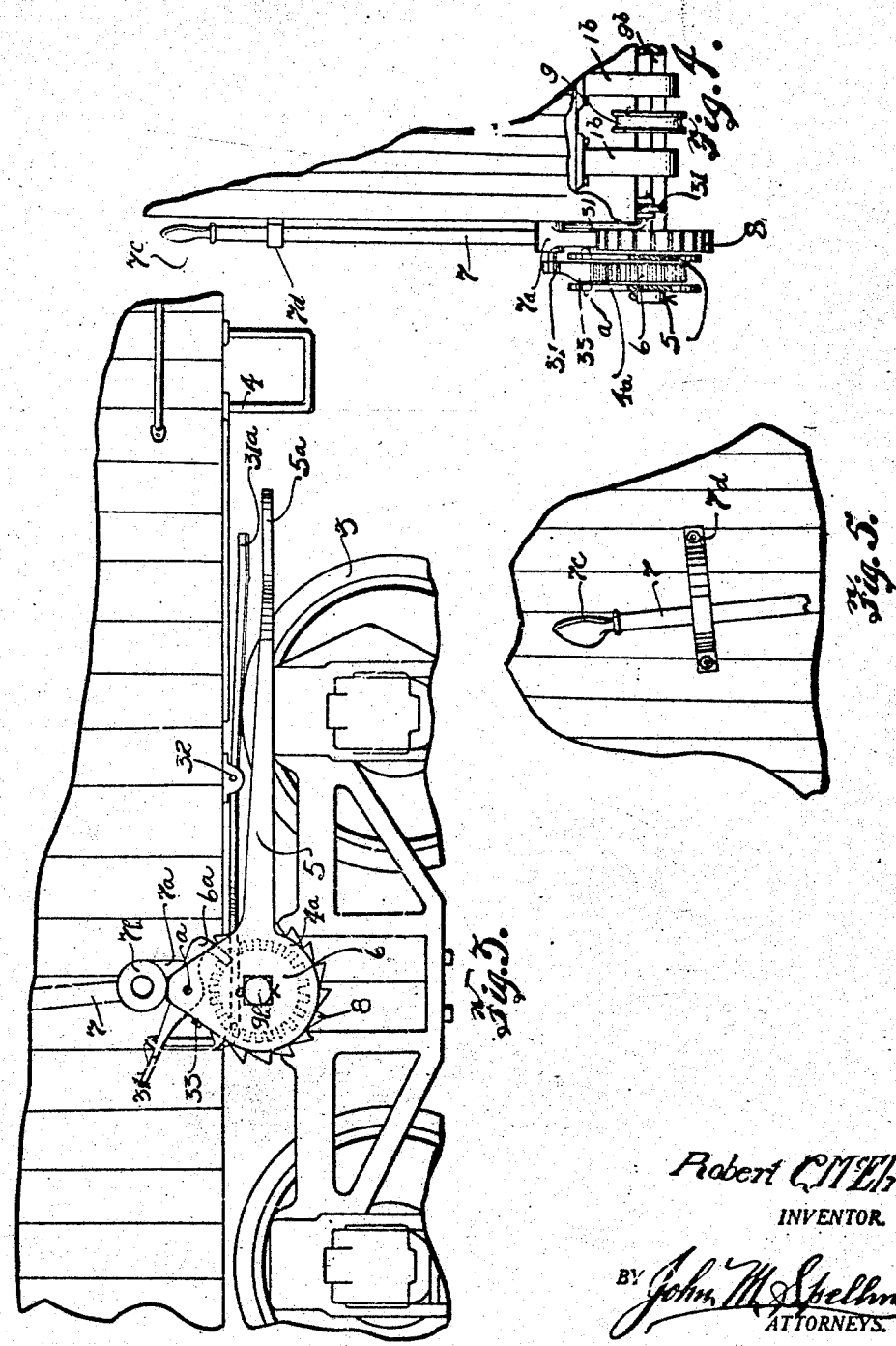

Patented Aug. 25, 1925.

1,550,980

UNITED STATES PATENT OFFICE.

ROBERT C. McELREE, OF DALLAS, TEXAS, ASSIGNOR, BY DIRECT AND MESNE ASSIGNMENTS, OF ONE-FOURTH TO WILLIAM R. JEWELL AND ONE-FOURTH TO DOSS R. MYERS, BOTH OF DALLAS, TEXAS.

COMBINATION SWITCHING AND HOLDING BRAKE FOR RAILWAY CARS.

Application filed December 3, 1923. Serial No. 678,341.

*To all whom it may concern:*

Be it known that I, ROBERT C. McELREE, a citizen of the United States, residing at Dallas, in the county of Dallas and State of Texas, have invented certain new and useful Improvements in Combination Switching and Holding Brakes for Railway Cars, of which the following is a specification.

This invention relates to railways, and refers more particularly to improvements in the braking equipment of said railways, the prime object being to provide a combination switching and holding brake which may be operated from a point adjacent the ground, preferably the sill step of the car whereon the brake is used.

Further objects are the provision of a means whereby the slack taken up by the action of the foot lever when the brakes are applied, will automatically release excess tension of the brakes, remaining after the foot lever has been released. Also the provision of a brake which may be operated with a greater degree of safety to the operator, and which may be applied in a minimum of time.

The invention does not interfere in any way with the present air brake or hand brake equipment, or the action thereof, but if necessary this brake may be used for supplanting the hand brake equipment.

Further objects and features as well as the above, are set forth in the following detailed description, taken in connection with the drawings attached hereto, and in which:—

Figure 1 represents a plan view of a car with the invention in attachment thereto.

Figure 2 represents a top plan view of a section of the braking mechanism.

Figures 3 and 4 represent detail views of portions of the brake mechanism.

Figure 5 represents a sectional view of a portion of the hand brake.

Referring to the drawing, 1 designates the car frame outline, having thereon truck frames 2 with wheels 3—3.

A short lateral shaft $9^b$ is situated directly beneath the floor of the car at a spaced distance from the end, and is supported thereon by standards $1^b$, as illustrated in Figure 4. Upon the end of the shaft extending from beneath the car is provided a foot lever 5, which is freely rotatable thereon, and is provided with a circular housing $4^a$ through which the shaft $9^b$ extends. Within this housing a ratchet wheel 6 is disposed upon a squared portion of the shaft $9^b$.

A dog or pawl $6^a$ is pivoted at $a$ in the upper portion of the housing $4^a$ and is situated so as to engage the ratchet 6 normally, due to a weighted head provided thereon. This dog also has an arm extending therefrom, the function of which will be later described. A small projection 33 is provided on the side of the housing $4^a$, which acts as a movement limiting means for the dog $6^a$.

Directly on one side of the housing $4^a$, also on a squared portion of the shaft $9^b$, is fixed a pinion 8, which may be engaged by a holding pawl $7^a$ on the hand lever 7, pivoted at point $7^b$ on the side of the car directly above the shaft $9^b$. It will be observed in Figure 5, that this lever has a weighted upper end portion $7^c$, which is adapted to hold the pawl out of engagement with the pinion 8, except when operated by hand to retain the accumulated tension on the brake chain produced by the actuating of the foot lever. This hand lever 7 is also provided with a movement limiting brace $7^d$.

At a point upon the squared portion of the shaft, beneath the car floor is fixed a pulley 9 and around which the chain 10 is wound. It will be understood that the shaft $9^b$ is squared the full length thereof except at points where bearings are required and at the point where the shaft is surrounded by the foot lever housing $4^a$.

In operation, the weighted head of the dog $6^a$ holds the same normally in engagement with the teeth of the ratchet 6. When the operator mounts the sill step 4 and applies his weight upon the stirrup $5^a$ of the lever 5, the shaft $9^b$ is thus rotated, causing the chain 10 to be wound about the pulley 9. This movement draws the rod 11 forward, see Figure 1, to actuate the cross rod 12, pivoted at $b$, thus operating the rods 13 and 27, secured to the forks 14 and 28 at the ends of the rods 15 and 28. These latter rods are directly attached to the braking mechanism, which is in turn associated with the brake shoes 21.

The standard braking mechanism is composed of two arms, 16 and 18, connected together at one end by a link member 17. The free end of the arm 16 is pivoted to the rod 15, while the free end of the arm 18 is secured rigidly to the truck frame, illustrated in Figure 1. At a point adjacent the center of the arms 16 and 18, the brake shoe rods 20—20 are secured. Thus when the pull is applied to the units described above, through the rods 15 and 18, the brake shoe rods 20 are moved to apply the brakes. The chains indicated at 14ª and 26ª permit the foot brake to be actuated without affecting the air brake system 25ª consisting of piston 25 and levers 22, 23, 24 and 29. The air brake may also be manipulated without affecting the function of the foot brake.

Upon depression of the foot lever, the slack in the chain 10 is reduced sufficiently to apply the brakes, which may require the depression of the lever a number of times before the chain may become sufficiently taut.

The dog 6ª, being in engagement with the ratchet 6 on the downward pressure of the lever 5, in order thereby to rotate the shaft, is automatically released at the extreme low position of the lever by the contact of the dog arm with the lateral extension of the arm 31, which arm is pivoted to the car frame at 32 and extends to a point directly above the stirrup 5ª of the lever 5.

Before the release of the dog from the ratchet 6, the hand lever 7 may be drawn forward to engage the pawl 7ª with the pinion 8 to prevent reverse movement of the shaft 9ᵇ, until a new purchase may be obtained by the dog on the ratchet. However, when the brake is being used for switching purposes, the hand brake is not usually required, as the foot brake will suffice and the brakes are not required to be permanently held.

In event the chain 10 is drawn too tightly around the pulley 9, resulting in excess breaking power, which obviously would, in the absence of the lever 31 force the stirrup 5ª tightly against the sill step 4, the lever 31 has been provided to afford a means for automatically releasing the excessive pressure by the contact of the stirrup 5ª with the lever 31 at point 31ª. Due to the pivotal attachment of the lever 31 to the car body; when the contact is made against the lever at 31ª, the lateral extension of the lever applies against the arm of the dog, thus raising the opposite end of the dog out of engagement with the ratchet 6, allowing the shaft 9ᵇ to reverse, thereby reducing the tension of the chain 10. This action of course takes place only when the pawl 7ª is out of engagement with the pinion 8.

It should be understood that the method and arrangement and the forms of the elements may be varied without departing from the spirit and intent of the invention as set forth in the following claims:

1. A foot actuated brake for freight cars including a shaft mounted on the car body, a foot lever having a bifurcated end portion freely mounted on the shaft; a ratchet wheel interposed between the forks of said bifurcated lever; means mounted on the foot lever to automatically engage the ratchet wheel upon depression of the lever to increase the tension on the brakes, and means to automatically effect release of said engagement.

2. A foot actuating brake for freight cars including a shaft on the car body, a bifurcated foot actuated lever freely mounted on said shaft; a ratchet wheel rigid on said shaft between the forks of said bifurcated lever, a dog pivoted between the forks of said lever and arranged to automatically engage the ratchet to effect movement of the shaft when the foot lever is depressed, and means for automatically releasing said engagement to effect reverse movement of the shaft to release excess tension on the brakes.

3. A device as per claim 2, in which a pinion is rigidly mounted on the shaft between the bifurcated end of said foot lever and the car body, and a second lever is mounted above the shaft and has a weighted upper extremity in pivotal attachment to the car body and also has a holding pawl arranged to engage said pinion to hold the accumulated tension on the brakes when the foot lever is released.

4. A switching and holding brake for railway cars including a shaft rotatably mounted on the car body and having flexible connection to the braking mechanism of the car; a foot actuated lever freely mounted on the shaft; means pivoted to the lever adjacent the shaft to normally engage the latter and effect rotation of the shaft upon depression of the lever; means to automatically release such engagement, and means to hold the shaft from reverse movement to retain the tension on the brakes when the foot lever resumes free movement upon the shaft.

5. In combination with the braking mechanism of freight cars, a centrally pivoted lateral rod beneath the car and pivoted intermediate its ends to the said braking mechanism; rods pivoted to the ends of said lateral rod and having chain extensions thereon; a shaft disposed laterally beneath the car body adjacent the ends thereof and having a pulley rigid thereon for engagement with the said chain extensions; a bifurcated foot actuated lever freely mounted on the shaft, means interposed between the forks of said bifurcated lever to normally engage the lever with the shaft to effect rotation of the latter when the lever is depressed; means for automatically disengaging the lever from the shaft upon depression of the lever, and means pivoted to the car body for holding said shaft from reverse movement when the foot lever is thereby released.

6. In combination with the braking mechanism of a freight car, a lateral rod pivoted centrally beneath the car and pivoted intermediate its ends to said braking mechanism; a shaft laterally supported beneath the car body having a pulley fixed thereon; means for flexibly connecting the pulley to the extremities of said lateral pivoted rod; a bifurcated foot actuated lever freely mounted upon the lateral shaft, means between the shaft and the lever for rotating the shaft upon depression of the lever; means for rendering said rotating means inoperative, and means to hold the shaft from reverse movement when the foot lever resumes free movement upon the shaft.

In testimony whereof I have signed my name to this specification.

ROBERT C. McELREE.